US007743553B1

(12) United States Patent
Codd et al.

(10) Patent No.: US 7,743,553 B1
(45) Date of Patent: Jun. 29, 2010

(54) SOIL FORMULATION FOR RESISTING EROSION

(75) Inventors: Dan Codd, Pasco, WA (US); Jim Hand, Walla Walla, WA (US)

(73) Assignee: James Edward Hand, Anacortes, WA (US)

( * ) Notice: Subject to any disclaimer, the term of this patent is extended or adjusted under 35 U.S.C. 154(b) by 16 days.

(21) Appl. No.: 11/865,448

(22) Filed: Oct. 1, 2007

Related U.S. Application Data

(60) Provisional application No. 60/827,649, filed on Sep. 29, 2006.

(51) Int. Cl.
*A01C 1/06* (2006.01)
*C09K 3/00* (2006.01)

(52) U.S. Cl. .......................................... 47/57.6; 252/1

(58) Field of Classification Search ................. 111/200, 111/900; 47/57.6, 1.01 R; 252/1, 182.11, 252/182, 12; 504/100
See application file for complete search history.

(56) References Cited

U.S. PATENT DOCUMENTS

| | | | |
|---|---|---|---|
| 3,938,279 A * | 2/1976 | Fonne | 47/9 |
| 3,981,800 A | 9/1976 | Ort | |
| 4,108,625 A * | 8/1978 | Okada | 71/9 |
| 4,252,901 A | 2/1981 | Fischer et al. | |
| 4,336,668 A | 6/1982 | Decker | |
| 4,378,238 A * | 3/1983 | Goertz | 504/101 |
| 4,818,405 A | 4/1989 | Vroom et al. | |
| 5,738,703 A * | 4/1998 | Bandurski | 71/9 |
| 5,860,245 A | 1/1999 | Welch | |
| 6,141,905 A * | 11/2000 | Rozental et al. | 47/58.1 R |
| 6,209,259 B1 * | 4/2001 | Madigan et al. | 47/57.6 |
| 6,296,766 B1 | 10/2001 | Breckenridge | |
| 6,569,332 B2 | 5/2003 | Ainsworth et al. | |
| 2005/0274075 A1 | 12/2005 | Freund | |
| 2006/0010712 A1 | 1/2006 | Carin et al. | |

* cited by examiner

*Primary Examiner*—Christopher J. Novosad
(74) *Attorney, Agent, or Firm*—Michael F. Hughes; Hughes Law Firm, PLLC

(57) ABSTRACT

This disclosure relates to soil erosion and the establishment of an appropriate seed bed. More specifically, the disclosure relates to a composition applied to exposed soil wherein the composition comprises organic material produced when the methane is burned from green manure and dried. This organic material combines seed and a liquid carrier, such that the substance can be hydraulically applied to the desired area. Fertilizer or other nutrients are often added to the mixture to further enhance the product and to encourage growth.

7 Claims, 1 Drawing Sheet

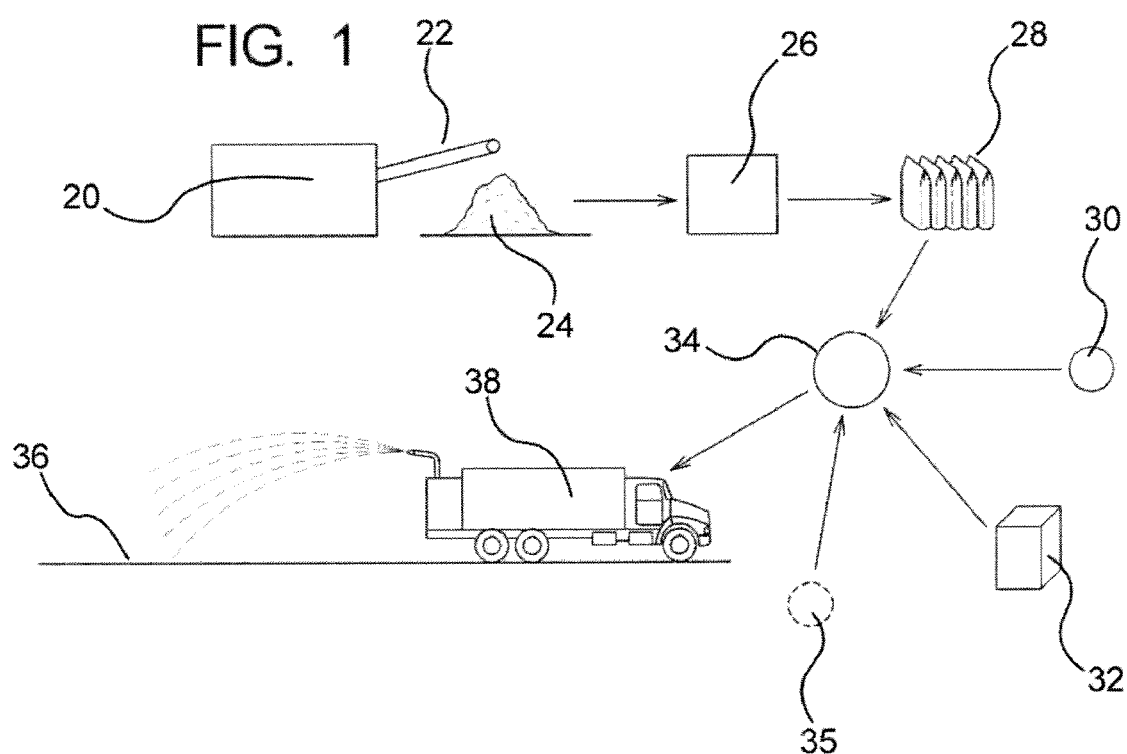

SOIL FORMULATION FOR RESISTING EROSION

RELATED APPLICATIONS

This application claims priority of U.S. Provisional Ser. No. 60/827,649, filed Sep. 29, 2006.

BACKGROUND OF THE DISCLOSURE

This disclosure relates to soil erosion and the establishment of an appropriate seed bed. More specifically, the disclosure relates to a composition applied to exposed soil wherein the composition comprises organic material produced when the methane is burned from green manure and dried. This organic material combines seed and a liquid carrier, such that the substance can be hydraulically applied to the desired area.

The application of soil erosion inhibitor in combination with a seed is known, and the typical formulation includes organic material, such as waste paper, sawdust or other fibrous products in combination with a liquid carrier, a cellulose product or binder and seed. The particular formulation of these materials will vary, depending upon the composition of the soil to which it is to be applied, the weather conditions under which it is applied and/or the method of application.

Fertilizer or other nutrients are often added to the mixture to further enhance the product and to encourage growth.

Soil erosion is a serious problem recognized and addressed worldwide. Yet, current data seems to suggest that in the United States, soil is being eroded about 17 times the rate at which it forms. Further data suggests that soil erosion rates in Asia, Africa and South America are about twice as high as that in the United States.

Because of this significance, historically attempts have been made to prevent or substantially reduce soil erosion, including the well-known methods of contour farming, terracing, no-till cultivation, strip farming and polyvarietal cultivation. Another well-known approach includes adding organic material to the soil through biodegradation of the soil to cause soil to stick together and resist erosion. Products have been introduced to provide at least temporary erosion conservation, particularly with respect to slopes, until such time as trees and other vegetation can take root.

Prior art products, however, are of limited effectiveness and often do not provide the desired degree of soil erosion resistance. Certain of these products, such as fiber matrices, can in fact inhibit new plant growth by acting as a barrier against proper germination.

Therefore, there is a need in the art for a composition and method to resist soil erosion to a greater degree than prior art compositions and methods. Further, there is a need for such compositions and methods which are non-toxic, biodegradable and which can be readily deployed, utilizing existing readily commercially available techniques and machinery.

Still further, there is a need for such a composition and method to be of a simple formulation and relatively inexpensive to produce, utilizing known and commercially available materials.

SUMMARY OF THE DISCLOSURE

The present disclosure specifically addresses and improves upon the prior art. In this regard, the present disclosure is directed to compositions and methods for eliminating or substantially reducing soil erosion and preparing an appropriate seed bed, while eliminating the need for expensive additives, such as fertilizer. As an example of the present disclosure, aqueous solution and organic materials, such as that produced when methane is removed from green manure, is combined in one form with a tackifier and seed, distributed on the surface of the soil under consideration. It is to be understood that inventive material could also be provided in dry form, such that the liquid could be applied at the time of application of the material.

It is therefore a purpose of the present disclosure to provide an erosion control seed bed which utilizes readily available organic material, e.g. a waste product of gas-producing green manure combined with a binding product as well as seed, in a form which may be formulated to address the soil and weather conditions and readily and inexpensively applied.

Another purpose of the present disclosure is to utilize a waste product in a manner which is environmentally sound and serves a useful and needed purpose.

BRIEF DESCRIPTION OF THE DRAWINGS

FIG. 1 shows a diagram of an embodiment of the disclosure.

DESCRIPTION OF THE PREFERRED EMBODIMENTS

The present disclosure is directed to compositions and methods for preventing or substantially reducing soil erosion, while simultaneously creating a seed bed and broadcasting seed. With regard to the composition, it is to be understood that raw or green manure is fed to a digester to extract methane gas, and the resultant waste product, or sludge, provides the organic component of the present inventive composition. The present inventive composition includes the waste sludge from the digestive process, and a polymer tackifier can be used in one form to assure adhesion between the particles and the desired seed to be germinated. It is to be understood that for purposes of consistency and predictability the waste or sludge must be dried to a certain point, for example 6% moisture, such that the formula may be carefully constructed.

The resultant composition could be either in a dried form and packaged such that it can be liquefied to the desired concentration at the time of application, or in the alternative, may be pre-mixed, including the required water carrier to permit the hydraulic distribution of the material. In actual practice, the soil will require some pre-preparation to ensure that purpose is as desired and is receptive to the inventive solution. The inventive solution is applied at a predetermined rate and the sludge or waste organic material serves to both retain moisture for germination and provides the nutrients necessary for promoting rapid and uniform growth.

It is thus to be seen that the present disclosure contemplates the utilization of the waste byproduct of another eco-friendly process to greatly reduce soil erosion and simultaneously promote the reproduction and growth of oxygen-producing matter. Because the composition is primarily waste product and water, it is extremely economical to use.

As shown in the highly schematic FIG. 1, there is shown a digesting process 20 where byproduct is forcibly repositioned from the process by way of a conveyer-like member such as an augur 22, and of course any plurality of methods can be utilized to reposition the material which is eventually deposited as shown schematically at 24. The post processed material 24 is essentially from a manure-like original source which in one form is cow manure or the like, which utilizes the digester 20 to conduct an anaerobic process to extract energy therefrom, in particular by way of combustible methane. The digesting byproduct 24 in one preferred form is a result from a base input product to the digesting system 20 from cows, specifically cow manure. Of course, other types of raw inputs for the digesting system 20 could be utilized such as dog feces, turkey droppings and other types of materials that have high nitrogen content, which is advantageous as described below. However, the cow manure is a desirable digestive byproduct because it does have a matrix-like structure as described herein which is desirable in a hydro seeding application, and further has a high nitrogen content which aids in the germination and the facilitation of the growth of the seed in the hydro seeding process.

Referring again to FIG. 1, after the digesting byproduct 24 is positioned from the digestion process 20 it is transferred to a post-processing phase schematically indicated at 26. In one form, the material is dried, screened and bagged. Further, depending upon the certain parameters it could be finely shredded. It should be noted that the digesting material can have a water weight between 4% and 20% in one form. For purposes of shipping and a final mixing process for the hydro seeding composition, such specific water density of the material should be known. It is desirable to have a low water retention within the material during the process 26 for purposes of shipping or a desirable range is approximately 6%

The post-processing procedure 26 which in one form could include an existing wood fiber mulching plant to conduct such processing, at some phase during the processing it dries the material in a drying assembly grid-like process known in the art. It is advantageous, as mentioned above, to lower the water weight to approximately 5% to 6% moisture content for purposes of shipping the material when it is bagged, and further handling the bags by hand by the individuals mixing up the hydro seeding slurry mixture.

The post-processing phase 26 further can provide a screening process to remove out the larger sized particulate matter from the digestion product and bags the material as schematically indicated at 28. The bag material 28 now is ready to be drop shipped or otherwise delivered to be utilized on-site for a hydro seeding process.

In general, the hydro seeding process includes a mixture generally comprised of seed 30, fertilizer 32, and a matrix substance such as the material 28. (Prior art forms of hydro seeding utilize wood fiber.) Further, in other forms, a tackifying agent 35 can be utilized to create a more rigid matrix-like structure to aid in water retention and the integrity of the distributed hydro seed. Of course in the present embodiment, as opposed to having wood fiber as done in the prior art, the material 28 can be utilized. As described above, the digestion byproduct material schematically indicated at 28 in FIG. 1 has a higher nitrogen content, and further when the byproduct is cow manure, the grass-like structure provides a desirable interlocking matrix to aid in the water retention of hydro seed composition. As shown in FIG. 1, the material 28, the seed 30 and a mixture of fertilizer 32 can all be utilized to make the hydro seed composition indicated at 34. Present analysis indicates that due to the high nitrogen content of the material 28, perhaps in some cases less fertilizer can be utilized. In actual application, fertilizer bags are positioned on a trailer and shipped to the site where the hydro seeding is to be commenced. This takes up a fair amount of space and weight which can oftentimes cause logistical issues in transporting the material. Therefore, the high nitrogen content of the material 28 can be particularly useful for facilitating the growth of the seed and reducing the total cost of the operation.

It should be noted that in other forms, the material 28 can be mixed with existing known similar material such as wood pulp, straw, grass clippings, or paper byproduct for purposes of a making a hydro seed composition 34. As noted above, an optional ingredient to be included in the hydro seed composition is the tackifying agent 35 such as a guar material or other hydrophilic material, which increases the integrity of the distributed hydro seed material which is schematically shown in the lower left-hand portion of FIG. 1 at 36. The hydro seed distributing member 38 distributes the composition 34 and the hydro seed may be germinated, pre-germinated or post-germinated when distribution occurs.

While the present disclosure is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The disclosure in its broader aspects is therefore not limited to the specific details, representative apparatus and methods, and illustrative examples shown and described. Accordingly, departures may be made from such details without departing from the spirit or scope of applicants' general concept.

We claim:

1. A composition used, when combined with water, for hydro seeding, said composition comprising:
   a. an organic material of sterile manure, a waste product resulting from removing the methane from green manure;
   b. a binder;
   c. a seed;
   d. whereby the composition is operatively configured to be sprayed upon a surface, preventing erosion and establishing a seed bed, and wherein the sterile manure is 10% to 30% by weight, the seed is 60% to 85% by weight and the binder is 2% to 15% by weight.

2. The composition as recited in claim 1 wherein the organic material is a waste product of cattle.

3. The composition of claim 2 wherein the composition is formed into pellets for ease of handling and storage.

4. The composition as recited in claim 1 wherein the seed provided is grass seed.

5. The composition as recited in claim 1 wherein the composition conforms to the "organic" standards as set forth by the USDA National Organic Standard.

6. The composition as recited in claim 1 wherein the composition conforms to the "organic" standards as set forth by the Association of American Plant Food Control Officials (AAPFCO).

7. The composition of claim 1 wherein the composition is maintained in dry form and is configured to be combined with water on-site for hydro seeding a surface area.

* * * * *